US 6,733,079 B2

(12) United States Patent
Gans et al.

(10) Patent No.: US 6,733,079 B2
(45) Date of Patent: May 11, 2004

(54) GUIDE SLEEVE FOR THE ROD OF A NECK REST

(75) Inventors: Matthias Gans, Wittighausen (DE); Christian Beck, Rottingen (DE); Ernst Otto Fröse, Solingen (DE)

(73) Assignees: ITW-Ateco G.m.b.H., Rottingen (DE); Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/326,117

(22) Filed: Dec. 23, 2002

(65) Prior Publication Data

US 2003/0151290 A1 Aug. 14, 2003

Related U.S. Application Data

(63) Continuation of application No. 09/559,430, filed on Apr. 27, 2000, now abandoned.

(30) Foreign Application Priority Data

Apr. 28, 1999 (DE) .......................................... 199 19 335

(51) Int. Cl.⁷ ................................................ A47C 1/10
(52) U.S. Cl. ......................................................... 297/410
(58) Field of Search .................................. 297/391, 410, 297/396, 463.1

(56) References Cited

U.S. PATENT DOCUMENTS

| 4,577,904 | A | * | 3/1986 | Wiese et al. | ................ | 297/410 |
| 4,854,642 | A | * | 8/1989 | Vidwans et al. | ............ | 297/410 |
| 5,080,437 | A | * | 1/1992 | Pesta et al. | .................. | 297/410 |
| 5,667,276 | A | * | 9/1997 | Connelly et al. | ............ | 297/410 |
| 5,788,250 | A | * | 8/1998 | Masters et al. | ............. | 297/410 |
| 5,927,813 | A | * | 7/1999 | Nemoto | ...................... | 297/391 |
| 6,021,777 | A | | 2/2000 | Post et al. | | |
| 6,062,645 | A | * | 5/2000 | Russell | ........................ | 297/410 |
| 6,099,077 | A | * | 8/2000 | Isaacson | ..................... | 297/410 |

FOREIGN PATENT DOCUMENTS

| DE | 34 37 803 | 6/1986 |
| EP | 0 267 503 | 5/1988 |
| EP | 0 965 481 | 12/1999 |
| FR | 2 571 317 | 4/1986 |

* cited by examiner

Primary Examiner—Peter R. Brown
Assistant Examiner—Stephen Vu
(74) Attorney, Agent, or Firm—Lowe Hauptman Gilman & Berner LLP

(57) ABSTRACT

A headrest guide sleeve for adjustably supporting a headrest pad is mounted in the back rest of a motor vehicle seat. The guide sleeve has a sleeve having a through bore for receiving the rod of the headrest, and a lever member rotatably fixed to an intermediate portion of the sleeve via a hinge mechanism. A biasing element is provided for biasing the lower end of the lever member toward the lower portion of the sleeve. The lever member includes a rib projecting into the through bore for engaging a notch formed on the rod. The upper end of the lever member is engaged with an actuating element. When the actuating element is actuated, the lever member is caused to rotate about the axis of the hinge mechanism against a biasing force of the biasing element thereby releasing the rib from the notch.

22 Claims, 2 Drawing Sheets

GUIDE SLEEVE FOR THE ROD OF A NECK REST

This application is a Continuation Application of Ser. No. 09/559,430, filed Apr. 27, 2000, now abandoned. The entirety of Application Ser. No. 09/559,430 is incorporated by reference herein.

FIELD OF THE INVENTION

This invention relates to a guide sleeve for the rod of a neck rest.

BACKGROUND ART

Such guide sleeves are usually made of plastic material. They are inserted into the back rest of a seat and serve for accommodating the rod of a neck rest which is intended to be locked in the guide sleeve in certain rest positions. It is known to arrange an actuating slide in an enlargement at the upper end of the guide sleeve, which cooperates with a spring or a similar detent member which cooperates with the notches of the neck rest rod so as to lock it in a pre-set position. Such guide sleeves operate satisfactorily, but have the drawback that the expenditure in mounting is relatively high.

SUMMARY OF THE INVENTION

Therefore, it is an object of the invention to create a guide sleeve for the rod of a neck rest in automobile vehicles, which causes a lower expenditure in mounting.

In conventional guide sleeves, a metallic spring is mostly used as a locking member, which requires to be brought to its shape in an appropriate stamping and bending procedure and which subsequently is mounted along with the actuating element. In the invention, however, a locking portion is disposed at the lower end of a deflection lever. The deflection lever extends parallel to the axis of the guide sleeve outside and is rotatably supported about an axis between the ends, which extends transverse to the longitudinal axis of the sleeve. The deflection lever is biased by spring means so that the spring biases the locking portion against the rod. The deflection lever is coupled to the actuating element at the upper end so that when the actuating element is actuated the lever may be pivoted in such a way that the locking portion gets out of engagement with a recess of the back rest rod.

In an aspect of the invention, the spring is formed by a ring of elastic material which encircles the sleeve and the deflection lever at the lower end. Preferably, the ring is disposed in groove portions of the deflection lever and the sleeve. The ring may be, for example, an O-ring or a spring washer of elastic material. In another aspect of the invention, coupling between the deflection lever and the actuating element may be effected in a way that an upper end portion of the deflection lever engages a recess or through hole of the actuating element. The actuating element may be plate-shaped and may be movable in a slide-like way in an appropriate recess of the upper enlargement of the guide sleeve. Because the neck rest rod must not impede the necessary motion of the actuating element the actuating element is preferably provided with an elongate hole.

Various possible designs are imaginable for the construction of the deflection lever. According to the invention, one is that the deflection lever is matched to the outer contour of the guide sleeve and partically encircles the guide sleeve. The deflection lever may have a bearing projection at both longitudinal sides which is rounded at the end thereof and engages a correspondingly formed bearing recess of the guide sleeve.

In order to prevent the actuating element from unintentionally being moved out of the enlargement of the guide sleeve or the upper end of the deflection lever from unintentionally being pivoted away from the guide sleeve a window is provided, in an aspect of the invention, in the deflection lever above the support axis wherein a protrusion of the guide sleeve extends through the window. The protrusion serves for as an attachment or fixation means in the back rest structure. In an aspect of the invention, the deflection lever has a second window below the support axis wherein at least one protrusion extends through the window. Even this one forms a fixation means in the back rest.

BRIEF DESCRIPTION OF THE DRAWINGS

The invention will now be explained by way of an example shown in the drawings.

Figure 1:
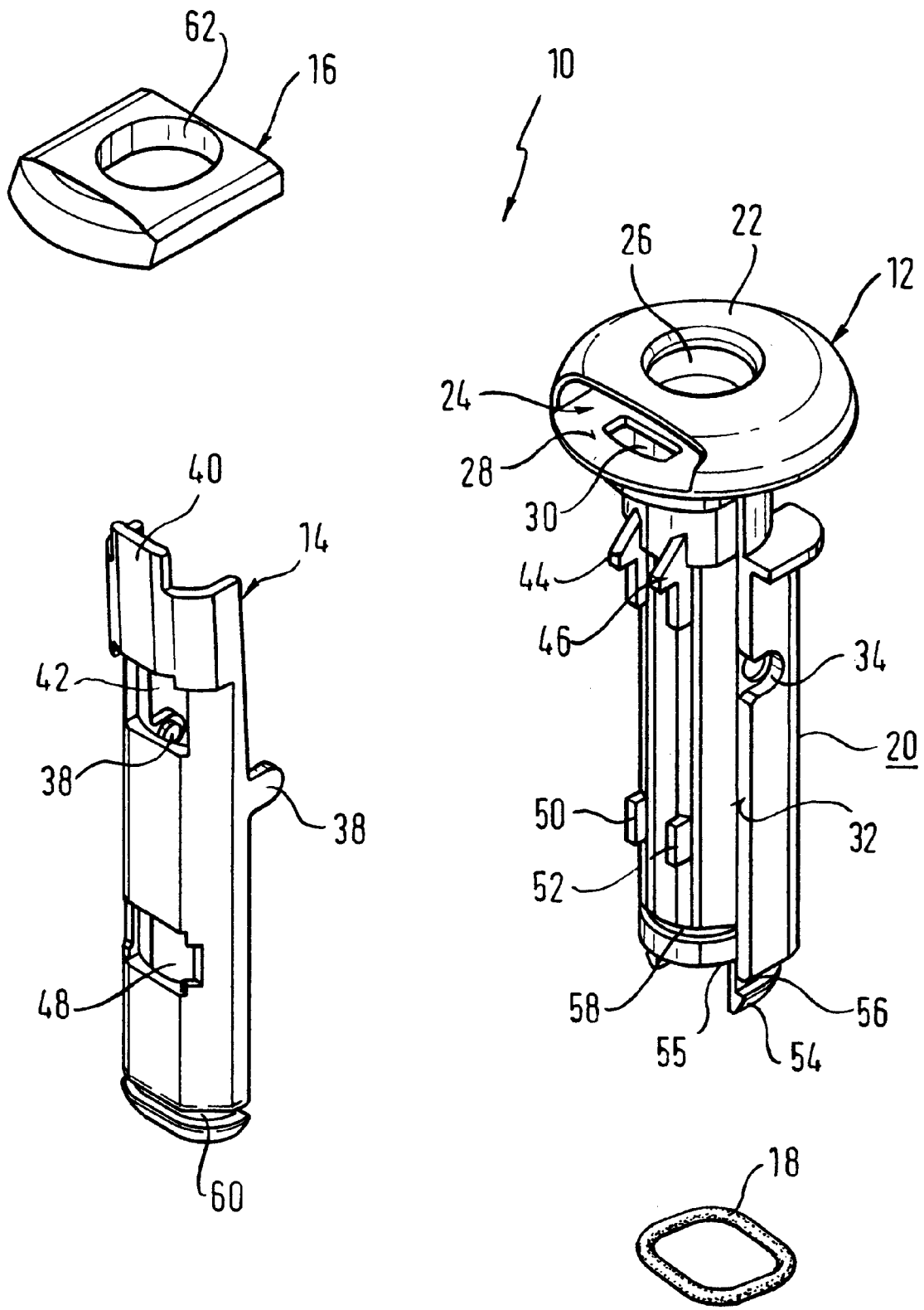
FIG. 1 shows an exploded perspective view of the guide sleeve according to the invention.
Figure 2:
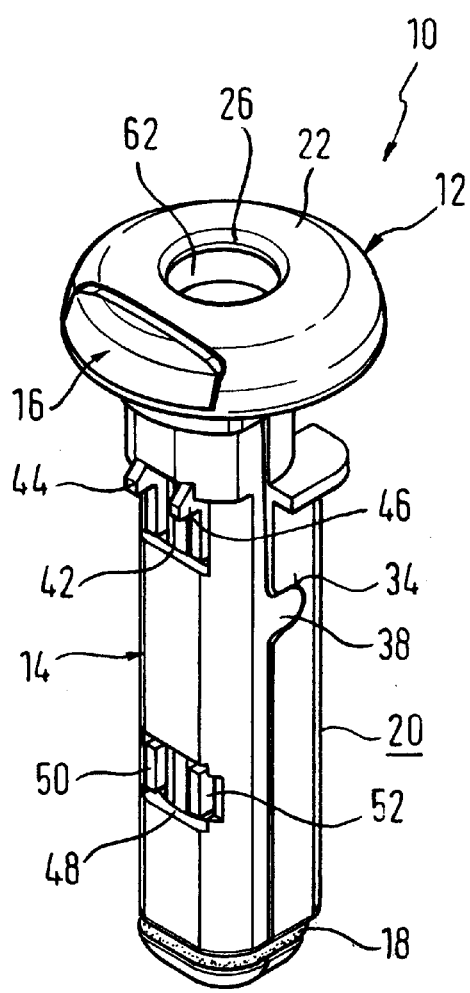
FIG. 2 shows a perspective view of how the guide sleeve is assembled.

The guide sleeve shown in FIGS. 1 and 2 for use on a rod of a neck rest in an automobile vehicle has a sleeve body 12, a deflection lever 14, a slide-like actuating element 16, and an O-ring 18. The individual components will now be explained in detail.

DETAILED DESCRIPTION OF THE INVENTION

The sleeve body 10 which is integrally formed from plastic material has an elongate hollow shank 20 which, in a very general sense, is of an approximately square cross-section which has strongly rounded corners. At its upper end, the body has a ring-shaped enlargement 22 which is hollow and has a lateral opening 24. The lateral opening 24 is in communication with the interior of enlargement 22 which extends transversely to a through bore 26 which extends across the whole sleeve body 12. An elongate opening 30 is defined in the bottom 28 of the interior of enlargement 22.

A circumferential region extending across the length of shank 20 has a contour reduced in its radius, which causes shoulders to be formed on opposed sides out of which one can be seen at 32. Formed into shoulder 32 is recess 34 which is rounded at its end and has a narrow cross-section. A second, equally-shaped recess is provided on the other side of shank 20 which cannot be seen.

The contour of shank 20 between shoulders 32 is complementary to the inside contour of the shell-shaped deflection lever 14. As can be seen from FIG. 2 the deflection lever may be inserted into the reduced-radius circumferential region. To this end, a bearing projection 38 which is rounded at its end engages the bearing recess 34. Because of the complementary shape given to the bearing projection with respect to bearing recess 34 the former is retained simultaneously and cannot be readily pulled out of the bearing recess. Prior to this, an upwardly extending projection 40 of deflection lever 14 is passed through opening 30 from below.

Deflection lever 14 has a first window 42 through which two spaced-apart projections 44, 46 of sleeve body 12 extend when deflection lever 14 is mounted on sleeve body 12 as described. Another window 48 below the window 42 of deflection lever 14 interacts with more projections 50, 52 disposed on shank 20. Projections 44, 46, on one hand, and projections 50, 52, on the other, are used to attach and secure guide sleeve 10 in the back rest.

The reduced-radius circumferential region of shank 20 is shorter than the rest of shank 20. This defines a downwardly projection portion 54 of shank 20 which is provided with a groove 56 at its outside. Portion 54 has formed a recess 56 in it. A ring-shaped slot 58 is defined above recess 56. Likewise, deflection lever 14, in its lower region, has a groove 60 extending in a circumferential direction, which is aligned with groove 56 when deflection lever 14 is mounted on sleeve body 12. Groove portions 56, 60 receive the O-ring 18 of FIG. 1. This interconnects the deflection lever 14 and the sleeve body 12 in the lower region and biases them towards each other. Since opening 62, however, has a dimension larger than the cross-section of the neck rest rod lever 14 may be pivoted to a limited extent, the pivoting axis being a horizontal axis which extends through recesses 34 and bearing projections 38.

Figure 3:
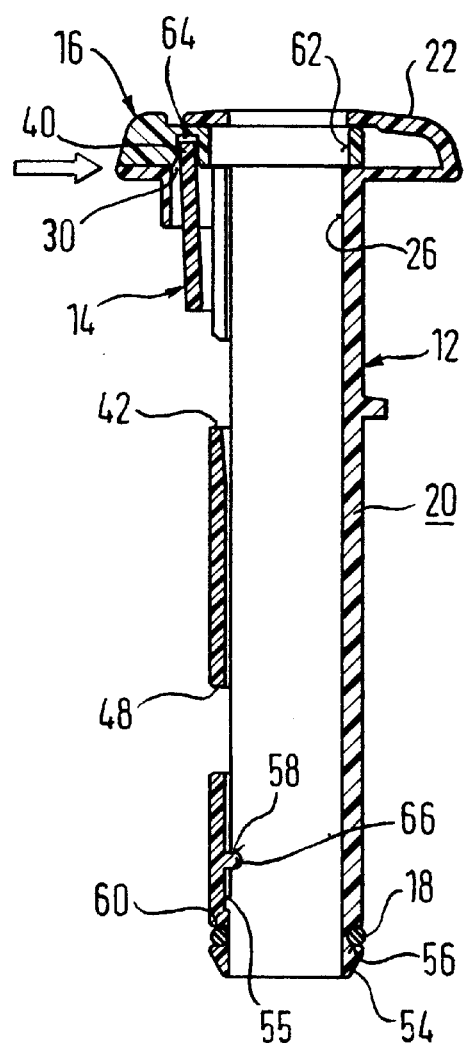
FIG. 3 shows a schematic section which illustrates the operation of the sleeve guide of FIG. 2.

Before deflection lever 14 is mounted the slide-like actuating element 16 is shifted into the cavity of enlargement 22 through opening 24. The cavity is formed in such a way that element 16 can only be moved in a linear direction. An elongated or oval opening 62 of the element is aligned with bore 26 in the sleeve body 12 and enables the rod of a neck rest to be passed through in different positions of element 16. Element 16 has a downward-facing recess 64 (see FIG. 3) which is engaged by projection 40 after being passed through opening 30 of enlargement 22. Deflection lever 14 will be pivoted in a clockwise direction by pressing the actuating element 16 into the interior of enlargement 22. This causes the lower region of deflection lever 14 to move away from shank 20 and an inside rib 66 on deflection lever 14 (see FIG. 3) to move out of slot 58. Rib 66 is used to interlockingly engage a recess in the rod (not shown) of the neck rest. This fixedly positions the rod in an axial direction. However, when rib 66 is moved out of slot 58 in the way described the neck rest may be axially moved. However, once actuating element 16 is released again the tension of the ring-shaped elastic spring 18 provides for rib 66 to re-cooperate with a notch of the neck rest rod.

What is claimed is:

1. A guide sleeve for adjustably supporting a rod of a neck rest, said guide sleeve comprising:
    a sleeve having a through bore for receiving the rod, said sleeve comprising upper, intermediate and lower portions;
    a lever member having upper and lower ends and rotatably attached to the intermediate portion of said sleeve so that said lever member is pivotable about an axis extending transverse to a longitudinal direction of the through bore;
    a biasing element biasing the lower end of said lever member toward the lower portion of said sleeve;
    a locking portion provided on said lever member and projecting into the through bore for engaging one of a plurality of notches formed on the rod; and
    an actuating element for engaging the upper end of said lever member for causing, when said actuating element is actuated, said lever member to rotate about the axis against a biasing force of said biasing element thereby releasing said locking portion from said notch.

2. The guide sleeve of claim 1, wherein said biasing element includes an elastic ring.

3. The guide sleeve of claim 2, wherein the elastic ring is received in grooves formed in the lower portion of said sleeve and the lower end of said lever member.

4. The guide sleeve of claim 1, wherein said actuating element includes a recess into which the upper end of said lever member extends.

5. The guide sleeve of claim 1, wherein said sleeve includes an inner tube defining the through bore, and an outer sheath substantially circumferentially complementary to said lever member, the outer sheath and said lever member together forming air outer casing for the inner tube.

6. The guide sleeve of claim 5, wherein the outer sheath of said sleeve has a rounded indentation and said lever member has a rounded projection conforming to and received in the rounded indentation, said lever member being rotatably attached to the intermediate portion of said sleeve by said rounded projection and said rounded indentation.

7. The guide sleeve of claim 1, wherein said lever member includes a first window positioned above said axis, and said sleeve includes at least a first projection extending through the first window for attaching said guide sleeve to a seatback.

8. The guide sleeve of claim 7, wherein said lever member further includes a second window positioned below said axis, and said sleeve includes at least a second projection extending through the second window for attaching said guide sleeve to the seatback.

9. The guide sleeve of claim 8, wherein at least one of said first and second projections is formed as a prong for preventing unintentional disengagement of said lever member from said sleeve.

10. The guide sleeve of claim 1, wherein said locking portion includes a rib formed integrally with said lever member, said rib extending through a slot formed on said sleeve into the through bore.

11. The guide sleeve of claim 1, wherein a rotational movement of said lever member about the axis is limited by abutment of the upper and lower portions of said sleeve with the upper and lower ends of said lever member, respectively.

12. The guide sleeve of claim 1, wherein said locking portion is disposed between said axis and the lower end of said lever member.

13. A guide sleeve for adjustably supporting a rod of a neck rest, said guide sleeve comprising:
    a sleeve having a through bore for receiving the rod, said sleeve comprising upper, intermediate and lower portion;
    a lever member having upper, middle and lower parts, the middle part of said lever member being rotatably attached to the intermediate portion of said sleeve so that said lever member is pivotable about an axis extending transverse to a longitudinal direction of the through bore;
    a locking portion carried by the lower part of said lever member and projecting into the through bore for engaging one of a plurality of notches formed on the rod;
    a biasing element biasing the locking portion into the through hole;
    wherein the upper part of said lever member is moveable with respect to the upper portion of said sleeve against biasing action of said biasing element to move said locking portion in a direction away from said through hole.

14. The guide sleeve of claim 13, wherein said biasing element includes an elastic ring received in grooves formed in the lower portion of said sleeve and the lower part of said lever member.

15. The guide sleeve of claim 13, further comprising a button moveable with respect to said sleeve and having a recess in which the upper part of said lever member is received, wherein when said button, and hence the upper part of said lever member, is moved toward said sleeve, the lower part of said lever member and the locking portion are pivoted about said axis away from said through hole.

16. The guide sleeve of claim 13, wherein said sleeve includes an inner tube defining the through bore, and an outer sheath, the outer sheath and said lever member together forming an outer casing for the inner tube, said lever member being pivotally attached to said outer sheath.

17. The guide sleeve of claim 13, wherein said lever member includes a first window, and said sleeve includes at least a first projection extending through the first window for attaching said guide sleeve to a seatback.

18. The guide sleeve of claim 17, wherein said lever member further includes a second window, and said sleeve includes at least a second projection extending through the second window for attaching said guide sleeve to the seatback, said first and second windows being positioned above and below said axis, respectively.

19. The guide sleeve of claim 13, wherein said locking portion includes a rib formed integrally with the lower part of said lever member, said rib extending through a slot formed on said sleeve into the through bore under the biasing action of said biasing element.

20. The guide sleeve of claim 13, wherein said sleeve has a rounded indentation and said lever member has a rounded projection received in the rounded indentation, said lever member being rotatably attached to the intermediate portion of said sleeve by said rounded projection and said rounded indentation.

21. The guide sleeve of claim 13, wherein the upper part of said lever member is moveable toward and away from the upper portion of said sleeve in a direction transverse to the longitudinal direction of the through bore.

22. In combination,
    a rod of a neck rest for an automobile seat, said rod having a plurality of notches formed thereon; and
    a guide sleeve for adjustably supporting said rod, said guide sleeve comprising:
        a sleeve having a through bore receiving said rod, said sleeve comprising upper, intermediate and lower portions;
        a lever member having upper, middle and lower parts, the middle part of said lever member being rotatably attached to the intermediate portion of said sleeve so that said lever member is pivotable about an axis extending transverse to a longitudinal direction of the through bore;
        a locking portion carried by the lower part of said lever member, projecting into the through bore, and engaging one of the notches formed on said rod;
        a biasing element biasing the locking portion into engagement with one of the notches formed on said rod;
        wherein the upper part of said lever member is moveable with respect to the upper portion of said sleeve against biasing action of said biasing element to move said locking portion out of engagement with the notches of said rod.

* * * * *

UNITED STATES PATENT AND TRADEMARK OFFICE
CERTIFICATE OF CORRECTION

PATENT NO. : 6,733,079 B2
DATED : May 11, 2004
INVENTOR(S) : Gans et al.

It is certified that error appears in the above-identified patent and that said Letters Patent is hereby corrected as shown below:

Title page,
Item [30], Foreign Application Priority Data, "199 19 335" should read, -- 199 19 335.5 --

Signed and Sealed this

Twenty-fourth Day of August, 2004

JON W. DUDAS
*Director of the United States Patent and Trademark Office*